US012608590B2

(12) United States Patent (10) Patent No.: US 12,608,590 B2

Ma et al. (45) Date of Patent: *Apr. 21, 2026

(54) GENERATION AND APPLICATION OF LOCATION EMBEDDINGS

(71) Applicant: DEERE & CO., Moline, IL (US)

(72) Inventors: Hongxu Ma, Mountain View, CA (US); Gengchen Mai, Santa Barbara, CA (US); Bin Ni, Fremont, CA (US)

(73) Assignee: DEERE & CO., Moline, IL (US)

( * ) Notice: Subject to any disclaimer, the term of this patent is extended or adjusted under 35 U.S.C. 154(b) by 1073 days.

This patent is subject to a terminal disclaimer.

(21) Appl. No.: 17/200,097

(22) Filed: Mar. 12, 2021

(65) Prior Publication Data

US 2022/0292330 A1 Sep. 15, 2022

(51) Int. Cl.
| | |
|---|---|
| *G06N 3/044* | (2023.01) |
| *G06F 16/29* | (2019.01) |
| *G06N 3/045* | (2023.01) |
| *G06N 3/08* | (2023.01) |

(52) U.S. Cl.
CPC .............. *G06N 3/044* (2023.01); *G06F 16/29* (2019.01); *G06N 3/045* (2023.01); *G06N 3/08* (2013.01)

(58) Field of Classification Search
CPC .......... G06N 3/044; G06N 3/045; G06N 3/08; G06F 16/29
See application file for complete search history.

(56) References Cited

U.S. PATENT DOCUMENTS

| | | | | |
|---|---|---|---|---|
| 10,120,093 | B2 * | 11/2018 | Le Calvez | ............... G01V 1/44 |
| 10,699,207 | B2 * | 6/2020 | Hunt | ......................... G06N 5/01 |
| 2018/0081339 | A1 * | 3/2018 | Zhu | ...................... G05B 19/406 |
| 2018/0211156 | A1 | 7/2018 | Guan et al. | |
| 2018/0240219 | A1 * | 8/2018 | Mentl | ...................... G06N 3/08 |

(Continued)

OTHER PUBLICATIONS

Brahma et al. (Solar Irradiance Forecasting Based on Deep Learning Methodologies and Multi-Site Data, Nov. 2020, pp. 1-20) (Year: 2020).*

(Continued)

*Primary Examiner* — George Giroux
(74) *Attorney, Agent, or Firm* — Hanley, Flight & Zimmerman, LLC

(57) ABSTRACT

Implementations are described herein for generating location embeddings that capture spatial dependence and heterogeneity of data, making the embeddings suitable for downstream statistical analysis and/or machine learning processing. In various implementations, a position coordinate for a geographic location of interest may be processed using a spatial dependence encoder to generate a first location embedding that captures spatial dependence of geospatial measure(s) for the geographic location of interest. The position coordinate may also be processed using a spatial heterogeneity encoder to generate a second location embedding that captures spatial heterogeneity of the geospatial measure(s) for the geographic location. A combined embedding corresponding to the geographic location may be generated based on the first and second location embeddings. The combined embedding may be processed using a function to determine a prediction for one or more of the geospatial measures of the geographic location of interest.

13 Claims, 5 Drawing Sheets

(56) References Cited

U.S. PATENT DOCUMENTS

| | | | | |
|---|---|---|---|---|
| 2019/0138423 | A1* | 5/2019 | Agerstam | G06F 11/3466 |
| 2020/0034759 | A1* | 1/2020 | Dumstorff | G06Q 50/02 |
| 2020/0125929 | A1* | 4/2020 | Guo | G06N 3/094 |
| 2020/0342304 | A1* | 10/2020 | Chu | G06N 3/088 |
| 2020/0356839 | A1 | 11/2020 | Tocornal et al. | |
| 2021/0271707 | A1* | 9/2021 | Lin | G06F 18/213 |
| 2022/0061236 | A1* | 3/2022 | Guan | A01G 7/00 |
| 2022/0101155 | A1* | 3/2022 | Beaudoin | G06N 5/04 |
| 2022/0290989 | A1* | 9/2022 | Bronevetsky | G06N 3/044 |

OTHER PUBLICATIONS

Pozdnoukhov et al. (Data-driven topo-climatic mapping with machine learning methods, Jan. 2009, pp. 497-518) (Year: 2009).*
Cong et al. (Multi-scale Bushfire Detection from Multi-modal Streams of Remote Sensing Data, Dec. 2020, pp. 1-18) (Year: 2020).*
U.S. Appl. No. 63/070,250 (Year: 2020).*
Jenkins et al. (Unsupervised Representation Learning of Spatial Data via Multimodal Embedding, Nov. 2019, pp. 1993-2002) (Year: 2019).*
Yin et al. (GPS2Vec: Pre-Trained Semantic Embeddings for Worldwide GPS Coordinates, Feb. 2021, pp. 890-903) (Year: 2021).*
Yao et al. (SERM: A Recurrent Model for Next Location Prediction in Semantic Trajectories, Nov. 2017, pp. 2411-2414) (Year: 2017).*
Gao et al. (Synthetic aperture radar image change detection based on frequency-domain analysis and random multigraphs, Mar. 2018, pp. 1-14) (Year: 2018).*
Hansen et al. (Translating climate forecasts into agricultural terms: advances and challenges, Dec. 2006, pp. 27-41) (Year: 2006).*
Yan et al. (From ITDL to Place2Vec—Reasoning About Place Type Similarity and Relatedness by Learning Embeddings From Augmented Spatial Contexts, Nov. 2017, pp. 1-10) (Year: 2017).*
Samano et al., "You Are Here: Geolocation by Embedding Maps and Images" arXiv:1911.08797v2 [cs.CV]. 18 pages. Dated Jul. 22, 2020.
Wu et al., "DeepETA: A Spatial-Temporal Sequential Neural Network Model for Estimating Time of Arrival in Package Delivery System" The Thirty-Third AAAI Conference on Artificial Intelligence (AAAI-19) 8 pages. 2019.
Wang et al., "BSENet: A Data-Driven Spatio-Temporal Representation Learning for Base Station Embedding" IEEE Access. Digital Object Identifier 10.1109/ACCESS.2020.2980597. 10 pages. Dated Mar. 24, 2020.
Mai et al., "Multi-Scale Representation Learning For Spatial Feature Distributions Using Grid Cells" Published As A Conference Paper At ICLR. 15 pages. 2020.
"Loc2Vec: Learning location embeddings with triplet-loss networks" Sentiance. Retreived from https://www.sentiance.com/2018/05/03venue-mapping/ 22 pages. Dated Jan. 4, 2021.
Schubert et al., "A U.S. Clivar Project to Assess and Compare the Responses of Global Climate Models to Drought-Related SST Forcing Patterns: Overview and Results" 2009 American Meteorological Society. DOI: 10.1175/2009JCLI3060.1. vol. 22. 22 pages. Oct. 1, 2009.
Ross et al., "A Climatology of 1980-2003 Extreme Weather and Climate Events" US Department of Commerce NOAA/NESDIS National Climatic Data Center. Technical Report No. 2003-01. Dec. 2003.
Reichstein et al., "Deep learning and process understanding for data-driven Earth system science" Perspective. https://doi.org/10.1038/s41586-019-1912-1. vol. 566. Feb. 14, 2019.
Park et al., "A key process of the nonstationary relationship between ENSO and the Western Pacific teleconnection pattern" Scientific Reports. DOI:10.1038/s41598-018-27906-z. Jun. 22, 2018.
Ntale et al., "Drought Indices and Their Application to East Africa" International Journal of Climatology. Wiley InterScience. DOI: 10.1002/joc.931. 2003.

Murphy, "Climatology, Persistence, and Their Linear Combination as Standards of Reference in Skill Scores" American Meteorological Society. vol. 7. 1992.
Mishra et al., "A Review of Drought Concepts" Journal of Hydrology. Elsevier. DOI:10.1016/j.jhydrol.2010.07.012. 15 pages. 2010.
Mann et al., "Climate change and California drought in the 21st century" PNAS. www.pnas.org/cgi/doi/10.1073/pnas.1503667112. vol. 112. No. 13. 2 pages. Mar. 31, 2015.
Mamalakis et al., "A new interhemispheric teleconnection increases predictability of winter precipitation in southwestern US" Nature Communications. DOI:10.1038/s41467-018-04722-7. 10 pages. 2018.
Comte, "1996 Weather Highlights: Around the World" Weatherwise, 50:1, 25-27, DOI:10.1080/00431672.1997.9926016. 4 pages. Jul. 8, 2010.
Janowicz et al., "GEoAI: spatially explicit artificial intelligence techniques for geographic knowledge discovery and beyond" International Journal of Geographical Information Science, 34:4, 625-636, DOI: 10.1080/13658816.2019.1684500. 13 pages. 2020.
Horridge et al., "The impact of the 2002-2003 drought in Australia" Journal of Policy Modeling. Elsevier. 24 pages. Jan. 29, 2005.
Dai, "Drought under global warming: A. Review" Advanced Review. John Wiley & Sons, Ltd. vol. 2. 21 pages. 2011.
Anh et al., "Downscaling rainfall using deep learning long short-term memory and feedforward neural network" International Journal of Climatology. DOI:10.1002/joc.6066. 19 pages. Mar. 6, 2019.
Park et al., "A key process of the nonstationary relationship between ENSO and the Western Pacific teleconnection pattern" Scientific Reports. DOI:10.1038/s41598-018-27906-z. 13 pages. Jun. 22, 2018.
Goodfellow et al., "Generative Adversarial Nets" arXiv:1406.2661v1 [stat.ML]. 9 pages. Jun. 10, 2014.
Wilhite, "Preparing for Drought: A guidebook for developing countries" United Nations Environment Programme. 80 pages. 1992.
Spinoni et al., "The biggest drought events in Europe from 1950 to 2012" Journal of Hydrology: Regional Studies 3. Elsevier. https://dx.doi.org/10.1016/j.ejrh.2015.01.001. 16 p. 2015.
Seager et al., "Causes of the 2011-2014 California Drought" Journal of Climate. vol. 28. DOI:10.1175/JCLI-D014-00860.1. 28 pages. Sep. 15, 2015.
Schubert et al., "Global Meteorological Drought: A Synthesis of Current Understanding with a Focus on SST Drivers of Precipitation Deficits" American Meteorological Society. DOI:10.1175/JCLI-D-15-0452.1. vol. 29. 31 pages. Jun. 1, 2016.
Zhang et al., "Drought over East Asia: A Review" American Meteorological Society. DOI:10.1175/JCLI-D-14-00259.1. vol. 28. 25 pages. Apr. 15, 2015.
Yan et al., "From ITDL to Place2Vec-Reasoning About Place Type Similarity and Relatedness by Learning Embeddings from Augmented Spatial Contexts" SIGSPATIAL. 10 pages. Nov. 2017.
Zhang et al., "Joint Deep Learning for land cover and land use classification" Ordance Survey. Lancaster University (No. EAA7369).
Choi et al., "Uncertainty in future projections of the North Pacific subtropical high and its implication for California winter precipitation change" Journal of Geophysical Research: Atmospheres. DOI:10.1002/2015JD023858. 12 pages. 2016.
He et al., "Streaming End-To-End Speech Recognition For Mobile Devices" arXiv:1811306621v1 [cs.CL] 5 pages. Nov. 15, 2018.
Hao et al., "Seasonal Drought Prediction: Advances, Challenges, and Future Prospects" Review of Geophysics. DOI:10.1002/2016RG000549. 34 pages. Jan. 27, 2018.
"Frauen et al., Analysis of the Nonlinearity of El Nino-Southern Oscillations Teleconnections" American Meteorological Society. DOI:10.1175/JCLI-D-13-00757.1. 20 pages. Aug. 15, 2014.
Erfanian et al., "Unprecedented drought over tropical South America in 2016: significantly under-predicted by tropical SST" Scientific Reports. DOI:10.1038/s41598-017-05373-2. 11 pages. Jul. 19, 2017.
Enfield et al., "How ubiquitous is the dipole relationship in tropical Atlantic sea surface temperatures" Journal of Geophysical Research. vol. 104. No. C4. 8 pages. Apr. 15, 1999.
Devlin et al., "BERT: Pre-Training of Deep Bidirectional Transformers for Language Understanding" arXiv:1810.04805v2 [cs.CL]. 16 pages. May 24, 2019.

(56) References Cited

OTHER PUBLICATIONS

Batterbury et al., "The African Sahel 25 years after the great drought: assessing progress and moving towards new agendas and approaches" Global Environmental Change. Elsevier Science Ltd. 8 pages. 2001.

Ziat et al., "Spatio-Temporal Neural Networks for Space-Time Series Forecasting and Relations Discovery" arXiv:1804.08562v1 [cs.LG]. 10 pages. Apr. 23, 2018.

Gou et al., "DeepOcean:A Genearl Deep Learning Framework for Spatio-Temporal Ocean Sensing Data Prediction" IEEE Acess. vol. 8. 11 pages. Apr. 28, 2020.

Zhu et al., "Learning Temporal and Spatial Correlations Jointly: A Unified Framework for Wind Speed Prediction" IEEE. DOI:10. 1109/tste.2019.2897136. 14 pages. 2019.

Alhamshry, A. et al., "Prediction of summer rainfall over the source region of the Blue Nile by using telecommunications based on sea surface temperature"; Theoretical and Applied Climatology, vol. 137, No. 3; pp. 3077-3087; dated Feb. 8, 2019.

Chang, N-B. et al., "The impact of global unknown teleconnection patterns on terrestrial precipitation across North and Central America"; Atmospheric Research, vol. 193; pp. 107-124; dated Apr. 7, 2017.

Ham et al., "Deep learning for multi-year ENSO forecasts" Nanjing University; https://doi.org/10.1038/s41586-019-1559-7. 18 pages; dated Sep. 18, 2019.

Brahma; Solar Irradiance Forecasting Based on Deep Learning Methodologies and Multi-Site Data; pp. 1-20; dated 2020.

Pozdnoukhov et al.; Data-driven topo-climatic mapping with machine learning methods; pp. 497-518; dated Jan. 2009.

* cited by examiner

Figure 3:
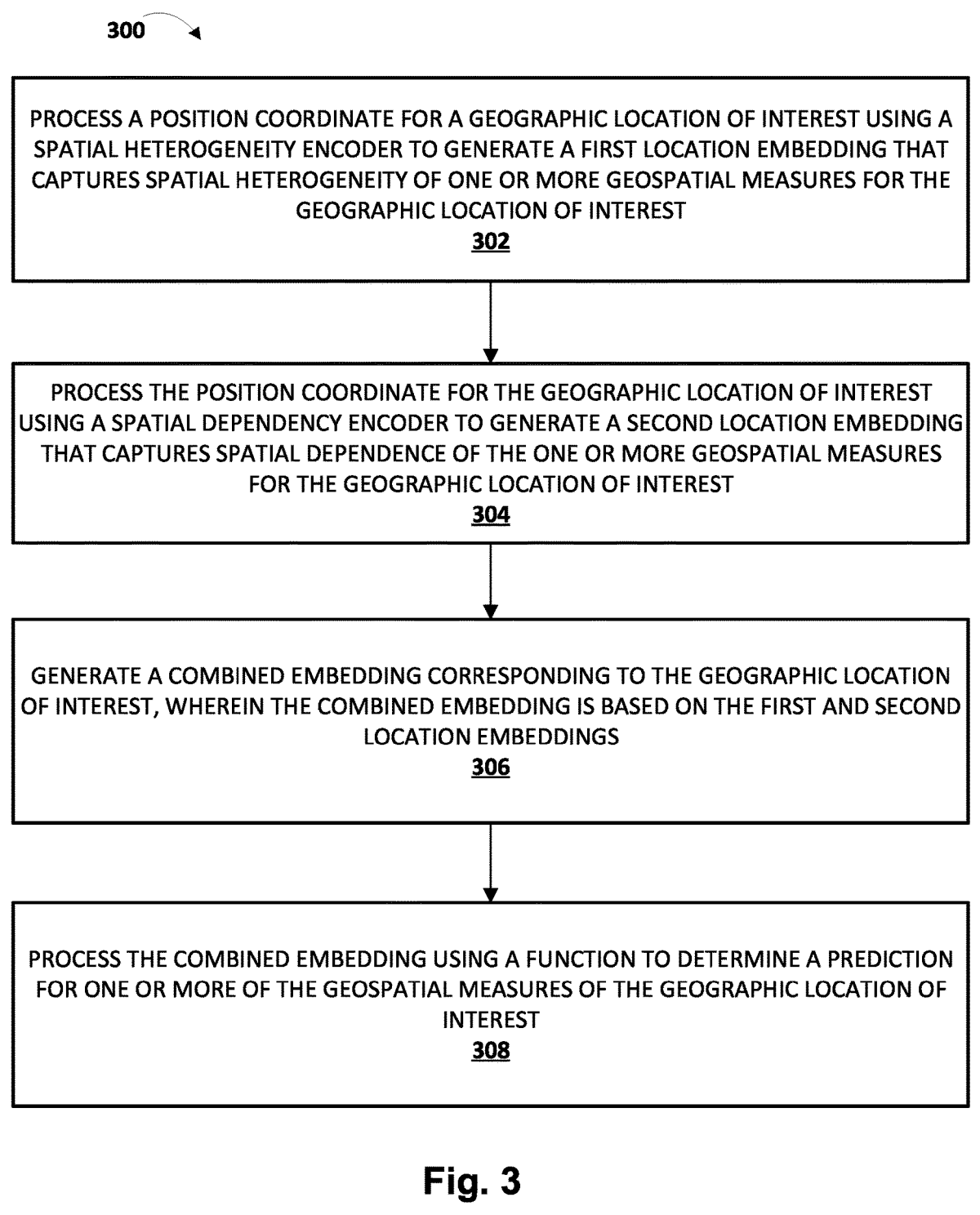

300

PROCESS A POSITION COORDINATE FOR A GEOGRAPHIC LOCATION OF INTEREST USING A SPATIAL HETEROGENEITY ENCODER TO GENERATE A FIRST LOCATION EMBEDDING THAT CAPTURES SPATIAL HETEROGENEITY OF ONE OR MORE GEOSPATIAL MEASURES FOR THE GEOGRAPHIC LOCATION OF INTEREST
302

PROCESS THE POSITION COORDINATE FOR THE GEOGRAPHIC LOCATION OF INTEREST USING A SPATIAL DEPENDENCY ENCODER TO GENERATE A SECOND LOCATION EMBEDDING THAT CAPTURES SPATIAL DEPENDENCE OF THE ONE OR MORE GEOSPATIAL MEASURES FOR THE GEOGRAPHIC LOCATION OF INTEREST
304

GENERATE A COMBINED EMBEDDING CORRESPONDING TO THE GEOGRAPHIC LOCATION OF INTEREST, WHEREIN THE COMBINED EMBEDDING IS BASED ON THE FIRST AND SECOND LOCATION EMBEDDINGS
306

PROCESS THE COMBINED EMBEDDING USING A FUNCTION TO DETERMINE A PREDICTION FOR ONE OR MORE OF THE GEOSPATIAL MEASURES OF THE GEOGRAPHIC LOCATION OF INTEREST
308

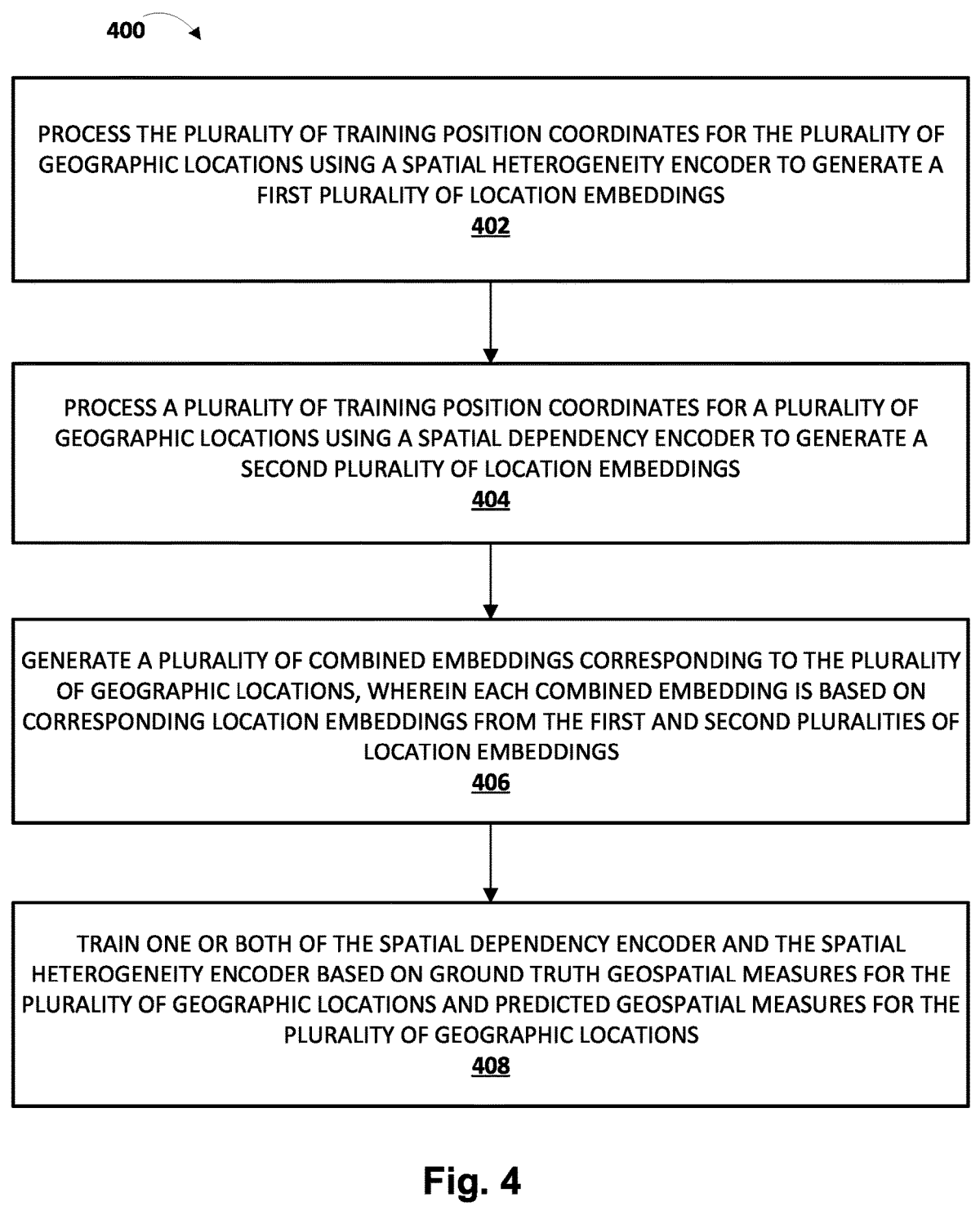

PROCESS THE PLURALITY OF TRAINING POSITION COORDINATES FOR THE PLURALITY OF GEOGRAPHIC LOCATIONS USING A SPATIAL HETEROGENEITY ENCODER TO GENERATE A FIRST PLURALITY OF LOCATION EMBEDDINGS
402

PROCESS A PLURALITY OF TRAINING POSITION COORDINATES FOR A PLURALITY OF GEOGRAPHIC LOCATIONS USING A SPATIAL DEPENDENCY ENCODER TO GENERATE A SECOND PLURALITY OF LOCATION EMBEDDINGS
404

GENERATE A PLURALITY OF COMBINED EMBEDDINGS CORRESPONDING TO THE PLURALITY OF GEOGRAPHIC LOCATIONS, WHEREIN EACH COMBINED EMBEDDING IS BASED ON CORRESPONDING LOCATION EMBEDDINGS FROM THE FIRST AND SECOND PLURALITIES OF LOCATION EMBEDDINGS
406

TRAIN ONE OR BOTH OF THE SPATIAL DEPENDENCY ENCODER AND THE SPATIAL HETEROGENEITY ENCODER BASED ON GROUND TRUTH GEOSPATIAL MEASURES FOR THE PLURALITY OF GEOGRAPHIC LOCATIONS AND PREDICTED GEOSPATIAL MEASURES FOR THE PLURALITY OF GEOGRAPHIC LOCATIONS
408

Fig. 4

GENERATION AND APPLICATION OF LOCATION EMBEDDINGS

BACKGROUND

Various geospatial data—data that includes a geographic component—may be measured and/or calculated for a geographic location for various purposes, such as evaluating the geographic location's suitability for agriculture, residential, and/or commercial development, growing various types of crops, forecasting food supplies, performing insurance actuation, real estate valuation, and/or for diagnosing changes in climate, to name a few. Geospatial data tends to vary among different geographic locations. This variance of geospatial data across geographic locations, described by a first-order statistic, is referred to as "spatial heterogeneity" and reflects the uniqueness of each geographic location relative to other geographic locations. However, according to Tobler's First Law of Geography, geographic locations that are close to each other often—but not always—exhibit similar characteristics and have similar properties such as climate patterns, soil, vegetation, geology, topography, etc. This dependency of geospatial data across proximate geographic locations—which stands in contrast to spatial heterogeneity and can be described using second-order statistics—is called "spatial dependence" or "spatial autocorrelation."

SUMMARY

Implementations are described herein for generating location embeddings that preserve both spatial dependence and spatial heterogeneity of geospatial data for geographic locations. By preserving these geospatial data characteristics, the location embeddings ensure that both spatial dependence and heterogeneity are reflected in various downstream analyses, such as predictions and/or inferences made using statistical analysis and/or machine learning processing.

In various implementations, during an inference phase to make a geospatial prediction about a geographic location of interest, a position coordinate that defines the geographic location of interest, such as a latitude-longitude pair or an x, y coordinate, etc., may be processed using a spatial heterogeneity encoder and a spatial dependence encoder. This processing may generate two location embeddings, which may be referred to herein alternatively as "partial location embeddings." One partial location embedding may capture spatial heterogeneity of geospatial data associated with the geographic location of interest. The other partial location embedding may capture spatial dependence of the geographic locations. These two location embeddings may then be combined into a combined embedding configured with selected aspects of the present disclosure. The combined embedding (which is also a location embedding) may then be used along with applicable geospatial data (e.g., geospatial measures such as precipitation, soil moisture, drought severity, etc.) for a variety of different purposes, including but not limited to making geospatial predictions about the geographic location of interest.

These combined location embeddings represent geographic locations in a high dimensional vector space such that distance and direction are preserved. Such location embeddings are particularly suitable for training downstream machine learning models such as support vector machines and multi-layer perceptrons. For a geospatial prediction problem such as predicting a geographic location's simple or aggregate properties (e.g., type of establishment, precipitation, soil moisture, Palmer drought severity index (PDSI), etc.) based on surrounding geographic locations, incorporating location embeddings that preserve both spatial heterogeneity and dependence into machine learning model design will enable the resulting machine learning model to make predictions/inferences that also reflect these spatial characteristics.

Encoding a geographic location into a location embedding that preserves both spatial heterogeneity and spatial proximity strikes a balance between the two characteristics. As noted above, in some implementations, different encoders—a spatial heterogeneity encoder and a spatial dependence encoder—may be implemented to capture these two aspects separately. Collectively, these two encoders (along with any other layers described herein) may form a "hybrid" encoder (e.g., a neural encoder) that preserves both the uniqueness of each geographic location (spatial heterogeneity) and the spatial dependence among multiple geographic locations. Location embeddings configured with selected aspects of the present disclosure may be used for a variety of purposes, such as grouping geographic areas into clusters of similar geographic areas, predicting geospatial measures and/or indicators/indices, and so forth.

In some implementations, a method may be implemented using one or more processors and may include: processing a position coordinate for a geographic location of interest using a spatial heterogeneity encoder to generate a first location embedding that captures spatial heterogeneity of one or more geospatial measures for the geographic location of interest; processing the position coordinate for the geographic location of interest using a spatial dependence encoder to generate a second location embedding that captures spatial dependence of the one or more geospatial measures for the geographic location of interest; generating a combined embedding corresponding to the geographic location of interest, wherein the combined embedding is based on the first and second location embeddings; and processing the combined embedding using a function to determine a prediction for one or more of the geospatial measures of the geographic location of interest.

In various implementations, the spatial heterogeneity encoder and the spatial dependence may be jointly trained. In various implementations, the function may be a support vector machine or neural network. In various implementations, one of the geospatial measures may be a drought index. In various implementations, processing the combined embedding using the function may include processing the combined embedding in combination with data indicative of one or more other geospatial measures of the geographic location of interest.

In various implementations, each position coordinate may be a longitude and a latitude. In various implementations, each position coordinate may be an x and y coordinate that identifies a center point of a cell of a two-dimensional grid of cells, wherein the geographic location of interest corresponds to a cell of the two-dimensional grid of cells.

In another aspect, method implemented using one or more processors may include: processing a plurality of training position coordinates for a plurality of geographic locations using a spatial heterogeneity encoder to generate a first plurality of location embeddings; processing the plurality of training position coordinates for the plurality of geographic locations using a spatial dependence encoder to generate a second plurality of location embeddings; generating a plurality of combined embeddings corresponding to the plurality of geographic locations, wherein each combined embedding is based on corresponding location embeddings from the first and second pluralities of location embeddings; and training one or both of the spatial dependence encoder and the spatial heterogeneity encoder based on ground truth geospatial measures for the plurality of geographic locations and predicted geospatial measures for the plurality of geographic locations, wherein the predicted geospatial measures are determined based on the plurality of combined embeddings.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 is a flowchart of an example method that is performable during an inference phase, in accordance with various implementations described herein.

FIG. 4 is a flowchart of an example method that is performable during a training phase, in accordance with various implementations described herein.

DETAILED DESCRIPTION

Figure 1:
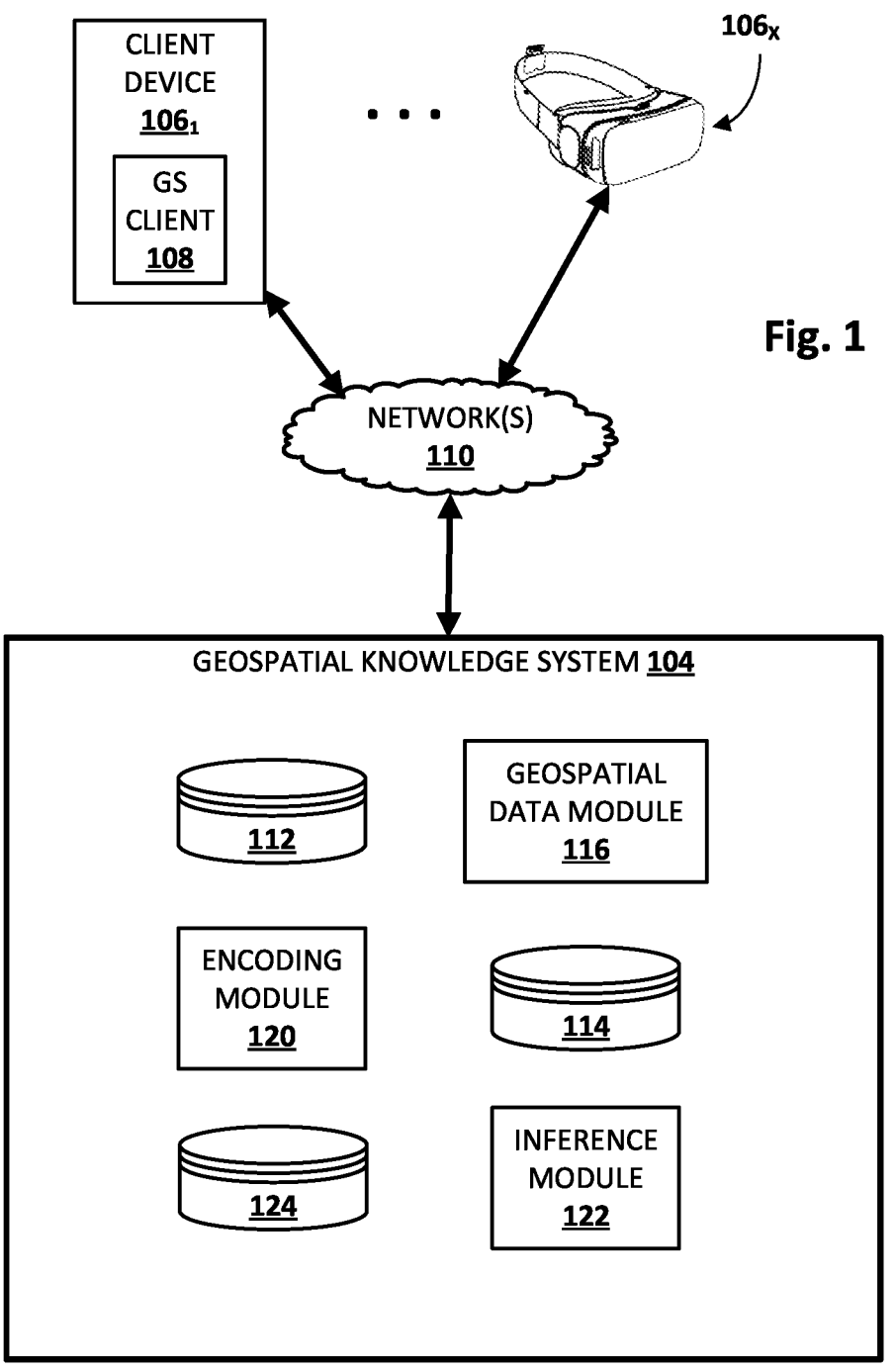
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes various components that may be configured to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc. Various components depicted in FIG. 1 and elsewhere may be implemented using any combination of hardware and software, including processor(s) executing instructions in memory, application-specific integrated circuits (ASICs), and/or field-programmable gate arrays (FPGAs).

An individual or "user" may operate one or more client devices 1061-x to interact with other components depicted in FIG. 1, such as a geospatial knowledge system 104. A client device 106 may be, for example, a desktop computing device, a laptop computing device, a tablet computing device, a mobile phone computing device, a computing device of a vehicle of the participant, a standalone interactive speaker (with or without a display), or a wearable apparatus that includes a computing device, such as a head-mounted display ("HMD") 106x that provides an AR or VR immersive computing experience, a "smart" watch, and so forth. Additional and/or alternative client devices may be provided.

Geospatial knowledge system 104 is an example of an information system in which the techniques described herein may be implemented. Each of client devices 106 and geospatial knowledge system 104 may include one or more memories for storage of data and software applications, one or more processors for accessing data and executing applications, and other components that facilitate communication over a network. The operations performed by client device 106 and/or geospatial knowledge system 104 may be distributed across multiple computer systems.

Each client device 106 may operate a variety of different applications that may be used to perform various geospatial tasks, such as predicting various geospatial measures. These geospatial measures can vary widely and be implemented across a variety of domains. In the geoscientific domain, for instance, geospatial measures may include, but are not limited to, climate conditions, drought severity, temperature, soil moisture, air pollution concentration, elevation, etc. In other domains, such as real estate or insurance, geospatial measures may include, for instance, real estate prices, risk measures that are usable by insurance actuaries, and so forth. In some implementations, geospatial measures may take the form of classifications, such as terrain type classifications, or classifications of points of interests into various types (e.g., commercial, residential, type of retail business, etc.), and so forth. In some implementations, a first client device 1061 operates geospatial ("GS") client 108 (e.g., which may be standalone or part of another application, such as part of a web browser). Another client device 106x may take the form of a HMD that is configured to render 2D and/or 3D data to a wearer as part of a VR immersive computing experience. The wearer may interact with the presented data, e.g., using HMD input techniques such as gaze directions, blinks, etc.

In some implementations, GS client 108 may be used to output recommendations and/or information that can help personnel in various domains (e.g., agricultural, urban planning, climate science, real estate, insurance, etc.) perform various geospatial tasks. For example, components of geospatial knowledge system 104 may perform selected aspects of the present disclosure to cause location embeddings to be generated for a given geographic location of interest. These location embeddings may in turn be used to make various geospatial predictions of the geographic location of interest sometime in the future, e.g., so that the personnel may take affirmative action and/or plan accordingly.

As used herein, a "geographic location of interest" or simply "geographic location" may refer to a discrete geographic area (or to a reference point thereof, such as its center) of varying sizes and/or shapes that can be defined in various ways. In some implementations, a geographic location may identify an area or region that is subject to generally homogenous or uniform climate conditions, e.g., compared to other geographic regions nearby or faraway. For example, a particular valley that extends across a state or county may experience relatively uniform climate conditions along its length, and therefore may be defined as a discrete geographic area. In some implementations, a greater geographic area may be organized into a two-dimensional grid of cells, with each individual cell corresponding to a discrete geographic location. In other implementations, a geographic location of interest may be defined politically (e.g., one or more counties, one or more states).

In various implementations, geospatial knowledge system 104 may be implemented across one or more computing systems that may be referred to as the "cloud." Geospatial knowledge system 104 may include a geospatial data module 116 that is configured to provide, from a geospatial database 112 to downstream component(s) such as an encoding module 120, geospatial measure(s) associated with geographic locations. Although shown as part of a centralized cloud infrastructure in FIG. 1, in some implementations, geospatial database 112 (and/or geospatial data module 116) may be distributed across multiple different locations. For example, instances of database 112 and/or module 116 may be maintained locally within and/or near each geographic location of interest, e.g., by local governments/governmental entities, farmers or co-ops, commercial entities, etc.

Geospatial data retrieved by geospatial data module 116 from geospatial database 112 may come in various forms and may include a wide variety of data about geographic locations. In some implementations, this geospatial data may include, for instance, soil moisture measurement(s), climate data such as temperature, precipitation, humidity, and/or wind, sunlight exposure, and other similar data associated with a geographic location. In some implementations, geospatial data may include time-series data, such as periodic soil moisture measurements, recorded weather events over time, precipitation over time, sunlight exposure over time, temperature over time, etc. In some implementations, geospatial data may include historical climate conditions observed in an agricultural area of interest. These historical climate conditions may or may not correspond to the climate condition(s) that are ultimately predicted using techniques described herein.

Geospatial knowledge system 104 may also include an encoding module 120. In various implementations, encoding module 120 may be configured to practice selected aspects of the present disclosure to generate location embeddings configured with selected aspects of the present disclosure. In some implementations encoding module 120 may generate a location embedding based on data indicative of encoder(s) stored in an encoder database 114. For example, encoder database 114 may include data such as weights that form spatial dependence and spatial heterogeneity encoders. These encoders may take various forms, such as neural networks (and in such cases may be referred to alternatively as "neural encoders").

Inference module 122 may be configured to apply machine learning models stored in a machine learning model database 124 to location embedding(s) generated by encoding module 120, e.g., along with other geospatial data obtained by geospatial data module 116. Based on this application, inference module 122 may generate various prediction(s) of geospatial measures associated with geographic locations of interest. Some examples of predictions of geospatial measures are described herein, but these are not meant to be limiting.

Various types of machine learning models may be trained to make geospatial predictions in accordance with various aspects of the present disclosure. In some implementations, a time- series machine learning model such as a recurrent neural network ("RNN"), long short-term memory ("LSTM") network, a gated recurrent unit ("GRU") network, a transformer network, etc., may be employed to generate climate condition predictions based on time-series data. In other implementations, feed forward neural networks may be employed. In yet other implementations, other machine learning and/or statistical models, such as Bayesian networks, support vector machines, and so forth, may be used to process location embeddings generated using techniques described herein.

In this specification, the term "database" and "index" will be used broadly to refer to any collection of data. The data of the database and/or the index does not need to be structured in any particular way and it can be stored on storage devices in one or more geographic locations.

Figure 2:
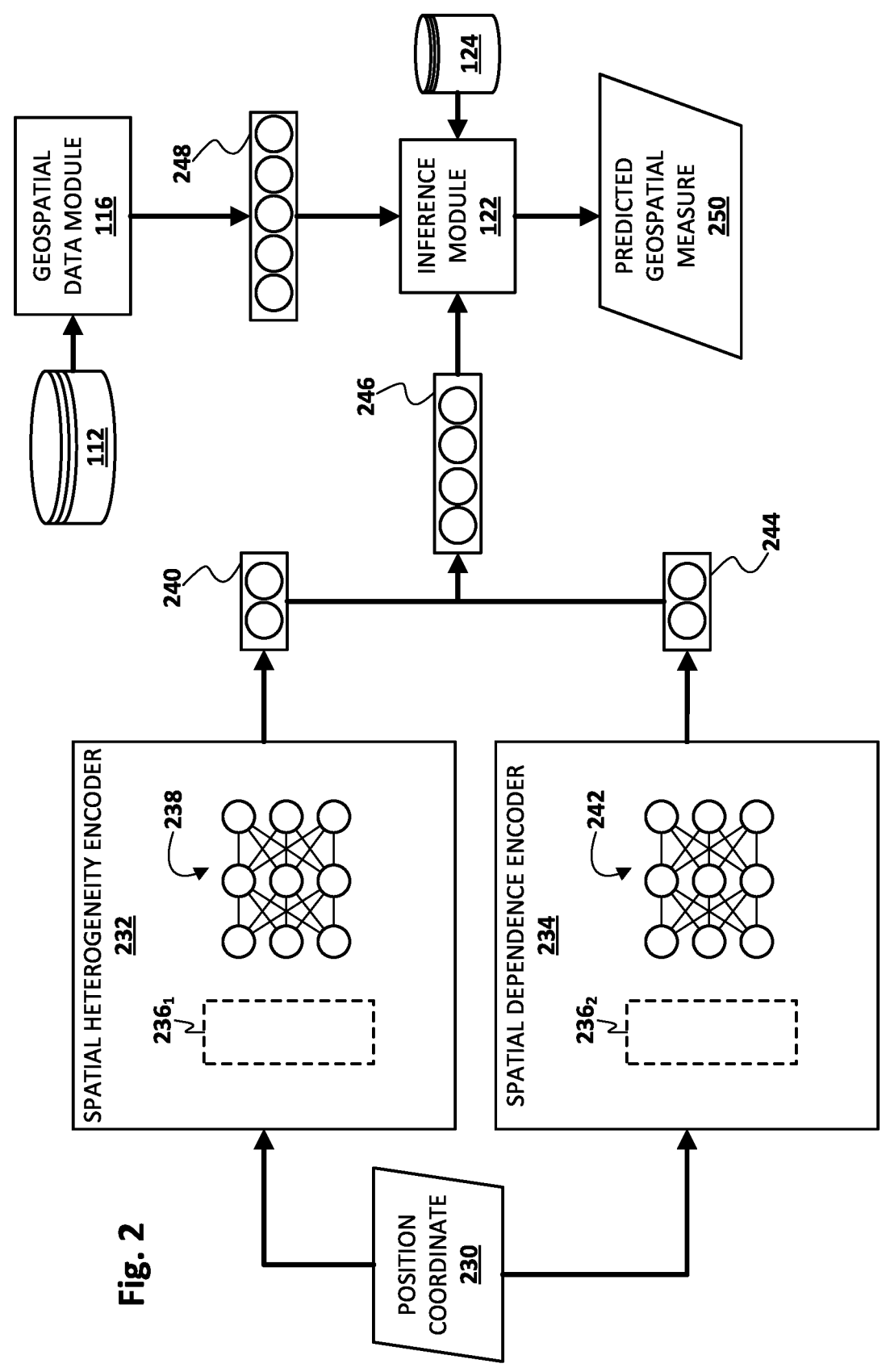
FIG. 2 schematically depicts components and a data flow that can be implemented to practice selected aspects of the present disclosure, in accordance with various implementations.

FIG. 2 depicts an example process flow for practicing selected aspects of the present disclosure to predict a geospatial measure based on a location embedding (e.g., combined embedding 246 in FIG. 2) generated using techniques described herein. Starting at left, a position coordinate 230 identifying a geographic location—e.g., a geographic location for which a geospatial prediction is desired—is provided as input. Position coordinate 230 may take various forms, depending on a variety of factors, such as how a greater geographic area is organized logically into smaller geographic locations. In some implementations, position coordinate 230 may take the form of a longitude and a latitude. Additionally or alternatively, in some implementations, position coordinate 230 may take the form of an x and y coordinate that identifies a center point of a cell in a two-dimensional grid of cells, in which each cell may correspond to a separate geographic location.

Position coordinate 230 may be processed, e.g., by encoding module 120 (not depicted in FIG. 2, see FIG. 1) based on a spatial heterogeneity encoder 232 and a spatial dependence encoder 234. In some implementations, the processing that occurs using each of these encoders 232, 234 may occur in parallel to the processing that occurs using the other of these encoders 232, 234, although this is not required.

Spatial heterogeneity encoder 232 may take various forms. In FIG. 2, for instance, spatial heterogeneity encoder 232 includes a first multi-scale feature decomposition layer $236_1$. In various implementations, first multi-scale feature decomposition layer $236_1$ may convert position coordinate 230 of relatively few dimensions, such as two (e.g., x and y, longitude and latitude), into a vector of greater dimensions, such as sixty-four. This vector of greater dimensions generated by first multi-scale feature decomposition layer $236_1$ may then be applied as input across a spatial heterogeneity neural network 238 to generate a first location embedding 240. In various implementations, and as will be described in further detail below, spatial heterogeneity encoder 232, including aspects of first multi-scale feature decomposition layer $236_1$ and/or spatial heterogeneity neural network 238, may have been trained (e.g., separately or jointly with spatial dependence encoder 234) previously to capture spatial heterogeneity of geospatial measures associated with a plurality of geographic locations. Consequently, first location embedding 240 also captures this spatial heterogeneity.

Spatial dependence encoder 234 likewise may take various forms. In FIG. 2, for instance, spatial dependence encoder 234 includes a second multi-scale feature decomposition layer $236_2$, which may be the same as or at least similar to first multi-scale feature decomposition layer $236_1$. Similar to before, second multi-scale feature decomposition layer $236_2$ may convert position coordinate 230 of relatively few dimensions, such as two (e.g., x and y, longitude and latitude), into a vector of greater dimensions, such as sixty-four. This vector of greater dimensions generated by second multi-scale feature decomposition layer $236_2$ may then be applied as input across a spatial dependence neural network 242 to generate a second location embedding 244. In various implementations, and as will be described in further detail below, spatial dependence encoder 234, including aspects of second multi-scale feature decomposition layer 236₂ and/or spatial dependence neural network 242, may have been trained (e.g., separately or jointly with spatial heterogeneity encoder 232) previously to capture spatial dependence of geospatial measures associated with a plurality of geographic locations. Consequently, second location embedding 244 also captures this spatial dependence.

In various implementations, first location embedding 240 and second location embedding 244 may be combined, e.g., by encoding module 120, into combined embedding 246. Combined embedding 246 (also referred to as "combined location embedding 246") may be generated from first location embedding 240 and second location embedding 244 in various ways, such as by using concatenation, addition, averaging, and so forth. Because first location embedding 240 and second location embedding 244 individually capture, respectively, spatial heterogeneity and spatial dependence of geospatial measures associated with the geographic location of interest, combined embedding 246 also captures spatial heterogeneity and spatial dependence of these geospatial measures.

Inference module 122 may process combined embedding 246 using various functions stored in database 124 to generate the predicted geospatial measure 250. These various functions may take various forms, including but not limited to various flavors of neural networks (e.g., feed-forward and/or sequence-to-sequence/recurrent), support vector machines, and/or any other statistical or machine learning model that is trainable to generate predicted geospatial measure 250. Because combined embedding 246 captures both spatial heterogeneity and spatial dependence of the geospatial measures associated with the geographic location of interest, these data characteristics are also captured in predicted geospatial measure 250.

In various implementations, inference module 122 uses other data 248 about the geographic location identified by position coordinate 230, in addition to location embedding 246, to generate predicted geo spatial measure 250 based on one or more functions (e.g., machine learning models) stored in database 124. For example, in FIG. 2, geospatial data module 116 may retrieve geospatial data associated with the geographic location identified by position coordinate 230, process it, and provide it to inference module 122 in the form of the embedding 248 depicted in FIG. 2. In some implementations, inference module 122 may take other data 248 in this form and combine it with combined embedding 246, e.g., using techniques such as concatenation, averaging, addition, etc., before generating predicted geospatial measure 250.

FIG. 3 illustrates a flowchart of an example method 300 for practicing selected aspects of the present disclosure during an inference phase. The operations of FIG. 3 can be performed by one or more processors, such as one or more processors of the various computing devices/systems described herein, such as by geospatial knowledge system 104. For convenience, operations of method 300 will be described as being performed by a system configured with selected aspects of the present disclosure. Other implementations may include additional operations than those illustrated in FIG. 3, may perform step(s) of FIG. 3 in a different order and/or in parallel, and/or may omit one or more of the operations of FIG. 3.

At block 302, the system, e.g., by way of encoding module 120, may process a position coordinate (e.g., 230 in FIG. 2) for a geographic location of interest using a spatial heterogeneity encoder (e.g., 232 in FIG. 2) to generate a first location embedding (e.g., 240 in FIG. 2) that captures spatial heterogeneity of the one or more geospatial measures for the geographic location of interest. At block 304, the system, e.g., by way of encoding module 120, may process the position coordinate (e.g., 230 in FIG. 2) for the geographic location of interest using a spatial dependence encoder (e.g., 234 in FIG. 2) to generate a second location embedding (e.g., 244 in FIG. 2) that captures spatial dependence of the one or more geospatial measures for the geographic location of interest.

At block 306, the system, e.g., by way of encoding module 120, may generate a combined embedding (e.g., 246 in FIG. 2) corresponding to the geographic location of interest based on the first and second location embeddings. In various implementations, the generation of block 306 may incorporate various techniques, such as concatenation, addition, averaging, etc. At block 308, the system, e.g., by way of inference module 122, may process the combined embedding using a function to determine a prediction (e.g., 250 in FIG. 2) for one or more of the geospatial measures of the geographic location of interest.

Because the spatial heterogeneity encoder 232 was trained previously using training geospatial data associated with a plurality of geographic locations to capture spatial heterogeneity of geospatial measure(s) for the plurality of geographic locations, the first location embedding captures spatial heterogeneity among one or more geospatial measures for the geographic location of interest. Similarly, because the spatial dependence encoder 234 was trained previously using training geospatial data associated with a plurality of geographic locations to capture spatial dependence of geospatial measure(s) among the plurality of geographic locations, the second location embedding captures spatial dependence among one or more geospatial measures for the geographic location of interest. Consequently, when these two encoders are used in combination, the resulting combined embedding (e.g., 246 in FIG. 2) exerts corresponding influence during the processing of other geospatial measure(s) (e.g., 248 in FIG. 2). As a result, predicted geospatial measure 250 also reflects both spatial heterogeneity and spatial dependence of the geographic location of interest.

FIG. 4 illustrates a flowchart of an example method 400 for practicing selected aspects of the present disclosure during a training phase. The operations of FIG. 4 can be performed by one or more processors, such as one or more processors of the various computing devices/systems described herein, such as by geospatial knowledge system 104. For convenience, operations of method 400 will be described as being performed by a system configured with selected aspects of the present disclosure. Other implementations may include additional operations than those illustrated in FIG. 4, may perform step(s) of FIG. 4 in a different order and/or in parallel, and/or may omit one or more of the operations of FIG. 4.

At block 402, the system, e.g., by way of encoding module 120, may process a plurality of training position coordinates for a plurality of geographic locations (for which ground truth geospatial measure(s) are available) using a spatial heterogeneity encoder to generate a first plurality of location embeddings. The operations of block 402 may share various characteristics with the operations of block 302 in FIG. 3.

At block 404, the system, e.g., by way of encoding module 120, may process the plurality of training position coordinates for the plurality of geographic locations using a spatial dependence encoder to generate a second plurality of location embeddings. The operations of block 404 may share various characteristics with the operations of block 304 in FIG. 3.

At block 406, the system, e.g., by way of encoding module 120, may generate a plurality of combined embeddings corresponding to the plurality of geographic locations. Each combined embedding may be generated based on corresponding location embeddings from the first and second pluralities of location embeddings, e.g., one location embedding (e.g., 240 in FIG. 2) that captures spatial heterogeneity of a given geographic location of interest and another location embedding (e.g., 244 in FIG. 2) that captures spatial dependence associated with the given geographic location of interest.

At block 408, the system, e.g., by way of inference module 122 or a separate training module (not depicted), may train one or both of the spatial heterogeneity encoder and the spatial dependence encoder based on ground truth geospatial measures for the plurality of geographic locations and predicted geospatial measures for the plurality of geographic locations. In various implementations, the predicted geospatial measures may be determined, e.g., by inference module 122, based on the plurality of combined embeddings and on other geospatial data (e.g., 248) associated with the plurality of geographic locations. Consequently, any error in these geospatial predictions may at least partially reflect a need to train spatial heterogeneity encoder 232 and/or spatial dependence encoder 234.

In some implementations, spatial heterogeneity encoder 232 and spatial dependence encoder 234 may be jointly trained. For example, and referring back to FIG. 2, for a given training instance, the predicted geospatial measure 250 (e.g., PDSI) for the training geographic location may be compared to a corresponding ground truth measure for the training geographic location. Any difference or error between these two values may be used to update weights of spatial heterogeneity encoder 232 and spatial dependence encoder 234, e.g., using techniques such as gradient descent and/or back propagation.

In other implementations, one or both of spatial heterogeneity encoder 232 and spatial dependence encoder 234 may be trained (or further trained) separately. For example, techniques such as triplet loss may be applied to train spatial dependence encoder 234 separately from spatial heterogeneity encoder 232. Triplet loss may be used to ensure that a given location embedding 244 corresponding to a geographic location of interest is closer in embedding space to other location embeddings corresponding to other geographic locations with similar geospatial measures.

For example, a first location embedding 244 generated for a first geographic location may be the "anchor" input. A second location embedding 244 generated for a second geographic location that has a similar geospatial measure (e.g., PDSI) as the first geographic location may be the positive or "truthy" input. A third location embedding 244 generated for a third geographic location that has a dissimilar geospatial measure (e.g., PDSI) as the first geographic location may be the negative or "falsy" input. To the extent the first location embedding is closer to the third location embedding (falsy) than it is to the second location embedding (truthy), spatial dependence encoder 234 may be trained, e.g., using gradient descent, back propagation, etc., to correct for this error. Distances in embedding space may be determined using various techniques, such as cosine similarity, dot product, etc.

Figure 5:
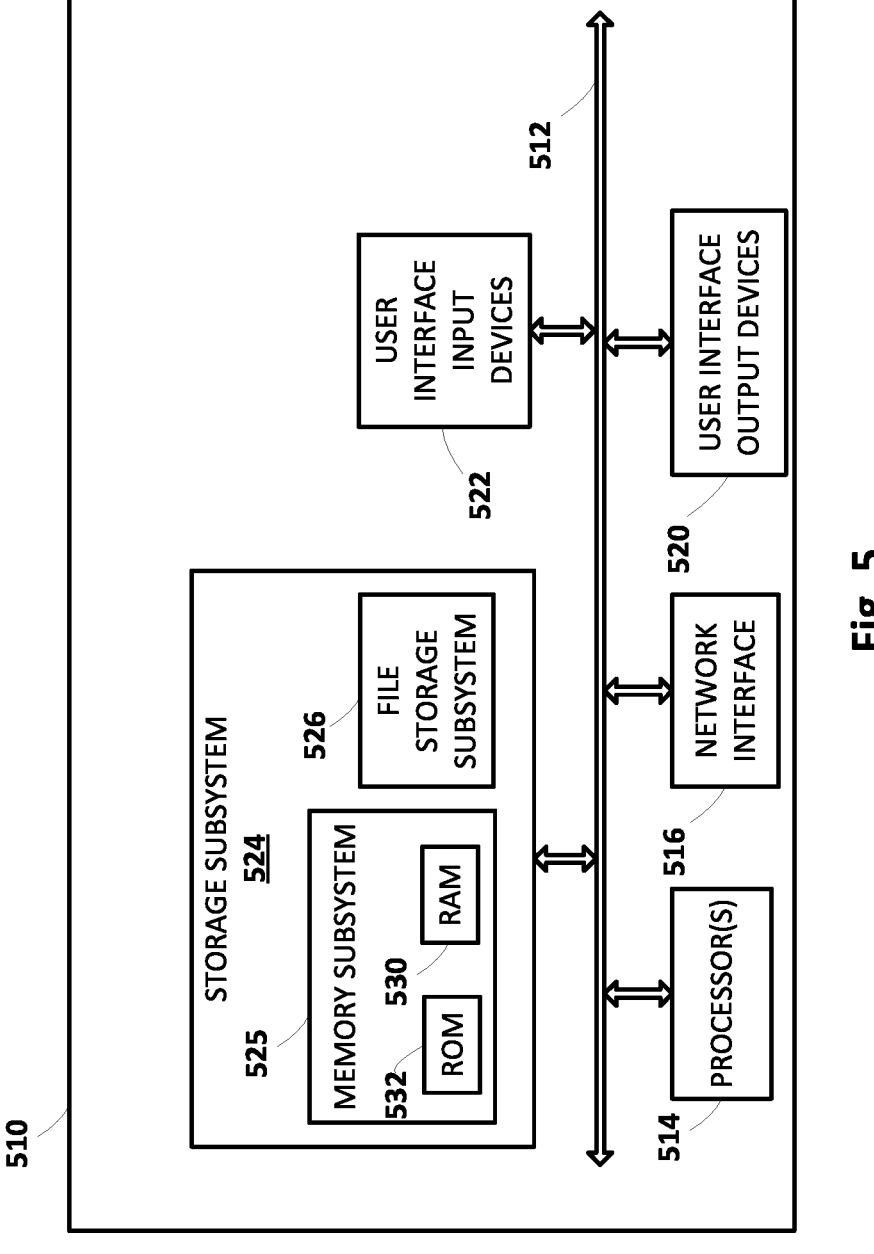
FIG. 5 schematically depicts an example architecture of a computer system.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 510 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of methods 300 or 400 described herein, as well as to implement various components depicted in FIGS. 1-2.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple buses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method to determine suitability for agriculture of a geographic location, the method implemented using one or more processors, and the method comprising:

converting, using a first multi-scale feature decomposition layer, a position coordinate for the geographic location into a first vector, the first vector having more dimensions than the position coordinate;

using a spatial heterogeneity encoder to generate a first location embedding based on the first vector, the first location embedding preserving spatial heterogeneity of a first geospatial measure for the geographic location;

converting, using a second multi-scale feature decomposition layer, the position coordinate for the geographic location into a second vector, the second vector having more dimensions than the position coordinate;

using a spatial dependence encoder to generate a second location embedding based on the second vector, the second location embedding preserving spatial dependence of the first geospatial measure for the geographic location;

generating a combined embedding corresponding to the geographic location, wherein the combined embedding is based on the first and second location embeddings;

processing the combined embedding using a function to determine a prediction for a second geospatial measure of the geographic location;

causing display of agricultural information based on the prediction; and training at least one of the spatial heterogeneity encoder or the spatial dependence encoder by:

generating an anchor embedding for a first training geographic location;

generating a truth embedding for a second training geographic location, the second training geographic location having a geospatial measure similar to that of the first training geographic location;

generating a false embedding for a third training geographic location, the third training geographic location having a geospatial measure dissimilar to that of the first training geographic location;

determining a first difference between the anchor embedding and the truth embedding;

determining a second difference between the anchor embedding and the false embedding; and at least one of applying gradient descent, applying back propagation, or updating the training weights of the spatial heterogeneity encoder or the spatial dependence encoder based on the first difference being greater than the second difference.

2. The method of claim 1, wherein the spatial heterogeneity encoder and the spatial dependence encoder are jointly trained by:

performing a comparison of the predicted one or more of the geospatial measures to a ground truth measure;

identifying a difference between the predicted one or more of the geospatial measures and the ground truth measure based on the comparison; and updating weights of the spatial heterogeneity encoder and the spatial dependence encoder based on the difference using at least one of gradient descent or back propagation.

3. The method of claim 1, wherein the function includes a support vector machine or neural network.

4. The method of claim 1, wherein the first geospatial measure includes one of climate conditions, drought severity, temperature, soil moisture, or air pollution concentration, and the second geospatial measure includes another of the climate conditions, drought severity, temperature, soil moisture, or air pollution concentration.

5. The method of claim 1, wherein each position coordinate includes a longitude and a latitude and the first vector has 64 dimensions, and the second vector has 64 dimensions.

6. The method of claim 1, wherein each position coordinate includes an x and y coordinate that identifies a center point of a cell of a two-dimensional grid of cells, wherein the geographic location corresponds to a cell of the two-dimensional grid of cells.

7. A method of training a neural network to determine suitability for agriculture of a geographic location, the method implemented using one or more processors, and the method comprising:

converting, using a first multi-scale feature decomposition layer, a plurality of training position coordinates for a plurality of geographic locations into a first vector, the first vector having more dimensions than dimensions of respective ones of the plurality of training position coordinates;

using a first encoder to generate a first plurality of location embeddings based on the first vector, the first plurality of location embeddings preserving spatial heterogeneity of the plurality of training position coordinates;

converting, using a second multi-scale feature decomposition layer, the plurality of training position coordinates for the plurality of geographic locations into a second vector, the second vector having more dimensions than dimensions of respective ones of the plurality of training position coordinates;

using a second encoder to generate a second plurality of location embeddings based on the second vector, the second plurality of location embeddings preserving spatial dependence of the plurality of training position coordinates;

generating a plurality of combined embeddings corresponding to the plurality of geographic locations, wherein each combined embedding is based on corresponding location embeddings from the first and second pluralities of location embeddings;

identifying a predicted geospatial measure based on the plurality of combined embeddings;

comparing the predicted geospatial measure to a ground truth measure;

identifying a difference between the predicted geospatial measure and the ground truth measure;

updating training weights that correspond to one or both of the first encoder and the second encoder based on the difference; and training at least one of the first encoder or the second encoder by:

generating an anchor embedding for a first geographic location;

generating a truth embedding for a second geographic location, the second geographic location having a geospatial measure similar to that of the first geographic location;

generating a false embedding for a third geographic location, the third geographic location having a geospatial measure dissimilar to that of the first geographic location;

determining a first difference between the anchor embedding and the truth embedding;

determining a second difference between the anchor embedding and the false embedding; and at least one of applying gradient descent, applying back propagation, or updating the training weights of the first encoder or the second encoder based on the first difference being greater than the second difference.

8. The method of claim 7, wherein the first encoder and the second encoder are jointly trained.

9. The method of claim 7, further including, subsequent to the training:

generating a new combined location embedding for a new geographic location, wherein generating the new combined location embedding includes processing a new position coordinate using the trained first and second encoders; and processing the new combined location embedding using the neural network to predict a new geospatial measure for the new geographic location.

10. The method of claim 7, wherein the predicted geospatial measure includes one or more of climate conditions, drought severity, temperature, soil moisture, or air pollution concentration.

11. The method of claim 9, wherein processing the new combined embedding using the neural network includes processing the new combined embedding in combination with data indicative of one or more geospatial measures of the new geographic location.

12. The method of claim 7, wherein each position coordinate includes a longitude and a latitude.

13. The method of claim 7, wherein each position coordinate includes an x and y coordinate that identifies a center point of a cell of a two-dimensional grid of cells, wherein each cell of the two-dimensional grid of cells corresponds to one of the plurality of geographic locations.

* * * * *